United States Patent [19]
Murata

[11] Patent Number: 5,769,196
[45] Date of Patent: Jun. 23, 1998

[54] TORQUE CONVERTER WITH A LOCK-UP MECHANISM

[75] Inventor: Kiyohito Murata, Susono, Japan

[73] Assignee: Toyota Jidosha Kabushiki Kaisha, Toyota, Japan

[21] Appl. No.: 698,259

[22] Filed: Aug. 14, 1996

[30] Foreign Application Priority Data

Aug. 23, 1995 [JP] Japan .................................. 7-214488

[51] Int. Cl.⁶ .......................... F16H 41/24; F16H 41/30; F16H 45/02
[52] U.S. Cl. .................................. 192/3.29; 192/113.32
[58] Field of Search .................................. 192/3.29, 3.3, 192/113.32

[56] References Cited

U.S. PATENT DOCUMENTS

| | | | |
|---|---|---|---|
| 2,462,652 | 2/1949 | Lysholm | 60/341 |
| 2,548,207 | 4/1951 | Dunn | 192/3.29 |
| 2,717,673 | 9/1955 | Zeidler | 192/3.3 |
| 2,815,684 | 12/1957 | Roche | 192/3.3 X |
| 4,953,353 | 9/1990 | Lederman . | |
| 5,168,702 | 12/1992 | Sakakibara et al. . | |
| 5,174,423 | 12/1992 | Tsukamoto et al. . | |
| 5,348,127 | 9/1994 | Murata et al. . | |
| 5,388,678 | 2/1995 | Murata . | |

FOREIGN PATENT DOCUMENTS

| | | |
|---|---|---|
| 2 035 719 | 12/1970 | France . |
| 2 498 717 | 7/1982 | France . |
| 55 112454 | 8/1980 | Japan . |
| 1 182665 | 7/1989 | Japan . |
| 2 256963 | 10/1990 | Japan . |

Primary Examiner—Khoi Q. Ta
Assistant Examiner—Saúl J. Rodriguer
Attorney, Agent, or Firm—Oblon, Spivak, McClelland, Maier & Neustadt, P.C.

[57] ABSTRACT

A torque converter with a lock-up mechanism used in an automobile capable for reliable shifting from an unlocked state to a locked-up state even in a coasting running. An oil passage is disposed for introducing hydraulic operating fluid used for engaging the lock-up clutch with the front cover to a first oil chamber defined between the stator and the turbine. A by-pass oil passage is branched from the oil passage for communicating the first oil passage and a second oil chamber defined between the stator and the pump, so that the hydraulic operating fluid used for engaging the lock-up clutch with the front cover is introduced to the second oil chamber having a lower oil pressure when the turbine pumps the circulating hydraulic operating fluid during coasting running of the automobile.

4 Claims, 11 Drawing Sheets

TORQUE CONVERTER WITH A LOCK-UP MECHANISM

BACKGROUND OF THE INVENTION

1. Field of the Invention

The present invention relates to a torque converter with a lock-up mechanism and, particularly, to a torque converter with a lock-up mechanism used for an automobile.

2. Description of the Related Art

A torque converter with a lock-up mechanism has been known which effects lock-up during deceleration running to obtain efficient engine braking (Japanese Unexamined Patent Publication (Kokai) No. 2-256963).

Shown in FIG. 14 is a torque converter with a lock-up mechanism of the same type as the one disclosed in the above-mentioned patent publication, wherein a pump impeller 3 coupled, via a pump cover 2, to a front cover 1 which is coupled to an input member (not shown), transfers fluid in cooperation with turbine blades 4 which are coupled to an output shaft 10 via a turbine cover 5, a stator 11 is arranged between the pump impeller 3 and the turbine blades 4 to rectify the hydraulic fluid, and a known lock-up clutch 6 having a lock-up piston 7 and a damper plate 8 is arranged between the turbine cover 5 and the front cover 1.

An oil passage 100 is used to introduce the hydraulic operating fluid into an oil chamber 102 formed between the pump impeller 3 and the stator 11 to obtain the locked-up state, and oil passages 200 are used to introduce the hydraulic operating fluid into an oil chamber 109 formed between the front cover 1 and the lock-up piston 7 to obtain the unlocked state.

Described below is a case when the unlocked state is shifted to the locked-up state in passive running i.e. during deceleration running driven by coasting.

To obtain the locked-up state, a hydraulic fluid introduced into the oil chamber 102 through the oil passage 100 is introduced into oil passages 104 in the gaps between the pump impeller 3 and the outer periphery of the turbine blades 4 by being assisted by the circulating flow which is generated between the pump impeller 3 and the turbine blades 4, and is further introduced into an oil chamber 108 which is defined by a damper plate 8 of a lock-up clutch 6, the back surface of the turbine cover 5 and the pump cover 2, in order to increase the pressure in the oil chamber 8 and, thereby increase the pressure acting on the side of the turbine cover 5 of the lock-up piston 7.

In the unlocked state in passive running, however, the hydraulic operating fluid is transferred from the turbine blades 4 to the pump impeller 3 contrary to the case of the active running; i.e. running driven by engine, and the circulating flow is generated in the clockwise direction as indicated by a broken arrow. In this condition, an oil chamber 106 defined between the turbine blades 4 and the stator 11 has a low pressure because it is located on the side where the hydraulic operating fluid to be circulated flows out, and the oil chamber 102, on the other hand, has a high pressure because of being located on the side where the circulating hydraulic operating fluid flows in.

Therefore, the hydraulic operating fluid introduced through the oil passage 100 in order to obtain the locked-up state, is blocked by a high oil pressure and is not permitted to transfer due to the circulating flow. Therefore, an insufficient amount of the hydraulic operating fluid is fed and thereby the pressure in the oil chamber 108 is not increased and, accordingly, the directly coupled state, i.e. the locked-up state, is not obtained.

SUMMARY OF THE INVENTION

In view of the above-mentioned problem, the object of the present invention is to provide a torque converter with a lock-up mechanism capable of reliable shifting from the unlocked state to the locked-up state even during the passive running.

According to the present invention there is provided a torque converter with a lock-up mechanism used in an automobile, which comprises a front cover connected with an input member, the input member being connected to an output shaft of an engine, a pump connected with the front cover, a turbine connected with an output member, the turbine circulating hydraulic operating fluid in the pump and the turbine in cooperation with the pump for thereby hydraulically coupling the input member and the output member, a stator supported by a fixed member through a one-way clutch and disposed in an area between radially inner portions of the pump and the turbine, the stator rectifying the circulating hydraulic operating fluid, a lock-up clutch connected with the output member and extended in an area between the turbine and the front cover, the lock-up clutch selectively engaged with the front cover for directly coupling the input member and the output member without use of the circulating hydraulic operating fluid, an oil passage for introducing hydraulic operating fluid used for engaging the lock-up clutch with the front cover to a first oil chamber defined between the stator and the turbine, and a by-pass oil passage branched from the oil passage for communicating the first oil passage and a second oil chamber defined between the stator and the pump so that the hydraulic operating fluid used for engaging the lock-up clutch with the front cover is introduced the second oil chamber having lower oil pressure when the turbine pumps the circulating hydraulic operating fluid during coasting running of the automobile.

BRIEF DESCRIPTION OF THE DRAWINGS

The present invention will be better understood from the description as set forth hereafter, with reference to the accompanying drawings, in which:

FIG. 1 is a sectional view illustrating a structure of the first embodiment of the present invention, wherein, as in the prior art, a pump cover 2 is coupled to a front cover 1 which is coupled, via an input member (not shown), to an engine output shaft (not shown), a pump impeller 3 is coupled to the pump cover 2, and turbine blades 4 are coupled to a turbine cover 5 to transfer the fluid in cooperation with the pump impeller 3.

Figure 1:
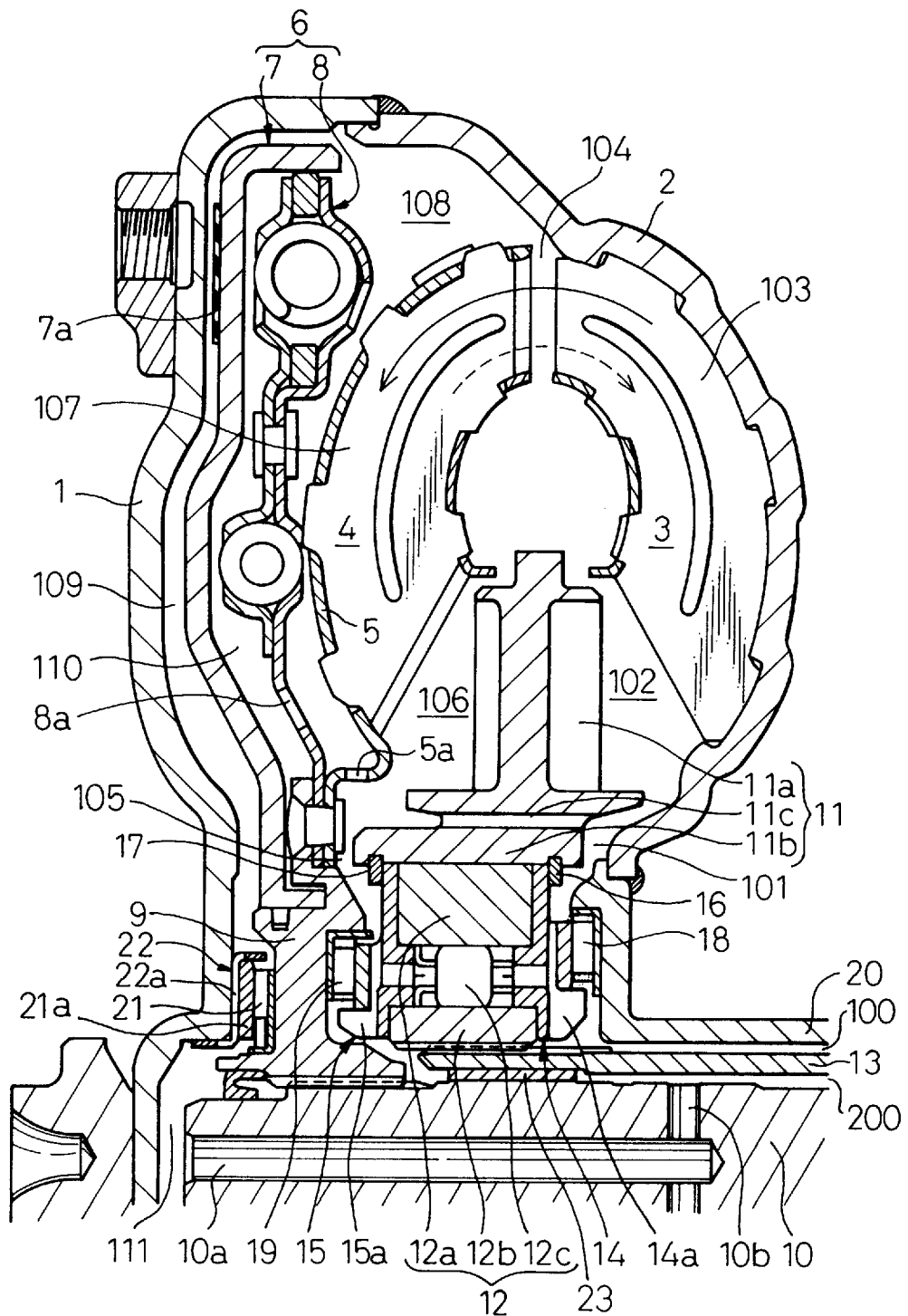
FIG. 1 is a sectional view illustrating a structure of the first embodiment of the present invention.

The lock-up clutch 6 has a known structure constituted by a piston 7 and a damper plate 8 which are peripherally coupled to each other at their radially outer end portions. The turbine cover 5 and the damper plate 8 of the lock-up clutch 6 are fastened at their radially inner end portions to a first hub 9 which is spline-coupled to an output shaft 10.

The stator 11 is composed a stator blade 11a and a stator base 11b which is provided with by-pass passage 11c which is specific to the present invention. A one-way clutch 12 is composed of an outer race 12a, an inner race 12b, and a spring type clutch piece 12c which is held therebetween. The outer race 12a is spline-coupled to the stator base 11b, and the inner race 12b is spline-coupled to an unmovable member 13 coupled to a housing (not shown). The one-way clutch 12 is axially positioned by snap rings 16 and 17 via a first one-way clutch support plate 14 and a second one-way clutch support plate 15.

The first one-way clutch support plate 14 and the second one-way clutch support plate 15 have a plurality of cut-out portions to form oil passages 14a and 15a along the side surfaces of the one-way clutch 12.

A first thrust bearing 18 is disposed between the first one-way clutch support plate 14 and a second cover member 20 which is coupled to the pump cover 2. A second thrust bearing 19 is disposed between the second one-way clutch support plate 15 and the first hub 9. A third thrust bearing 21 is disposed between the first hub 9 and the front cover 1. The front cover 1, first hub 9 and one-way clutch 12 are relatively rotatable to each other.

A third thrust bearing support member 22 for supporting the outer lace 21a of the third thrust bearing 21 has an oil passage 22a. An oil passage 100 is formed between the fastening member 13 and the second cover member 20. An oil passage 200 is formed between the fastening member 13 and the output shaft 10. In the output shaft 10, oil passages 10a and 10b which communicate with the oil passage 200 are also formed. In the drawing, what is designated by 23, at a left part of the oil passage 200, is a bush which prevents the oil passage 200 and the oil passage 100 from being short-circuited via a gap at the left end of the unmovable member 13.

Figure 2:
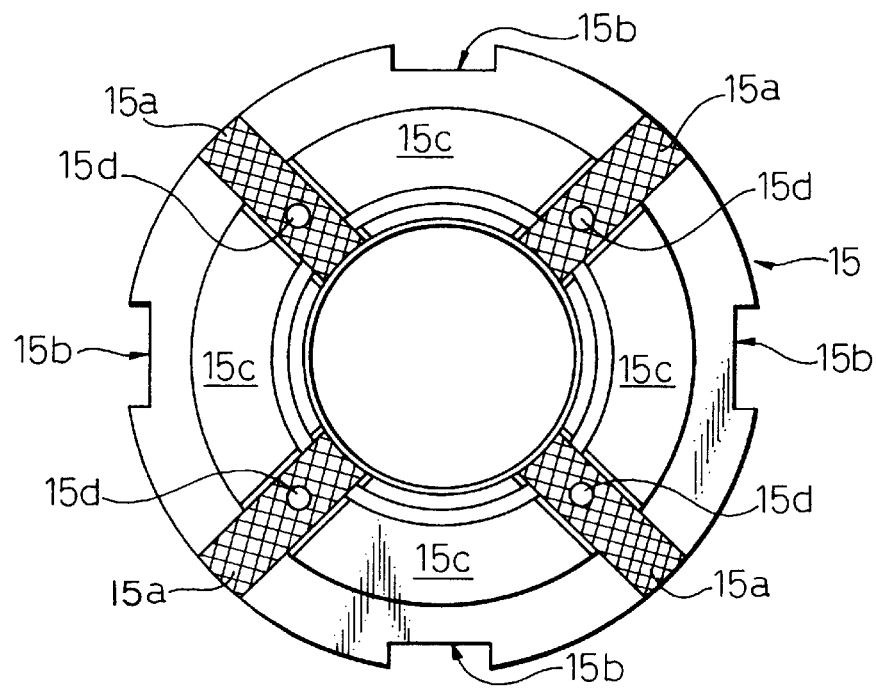
FIG. 2 is an axial view of the first one-way clutch support plate 14 of the first embodiment.

FIG. 2 is an axial view of the second one-way clutch support plate 15. In FIG. 2, reference numeral 15b denotes grooves that engage with projections 11d (see FIGS. 4 and 5) that are disposed on the inner peripheral surface of the stator 11 extending on the axial direction.

The cross-hatched portions shown on the second one-way clutch support plate 15 are shallowly cut out in the direction of the back of the paper relative to adjacent portions. Therefore, oil passage 15a is formed communicating the radially inner side with the radially outer side despite a first thrust bearing 18 is disposed in intimate contact with the fan-shaped portion 15c on the side of the front surface of the paper in FIG. 2.

Reference numeral 15d denotes holes for feeding the hydraulic operating fluid for lubricating the clutch piece 12c of the one-way clutch 12.

Figure 3:
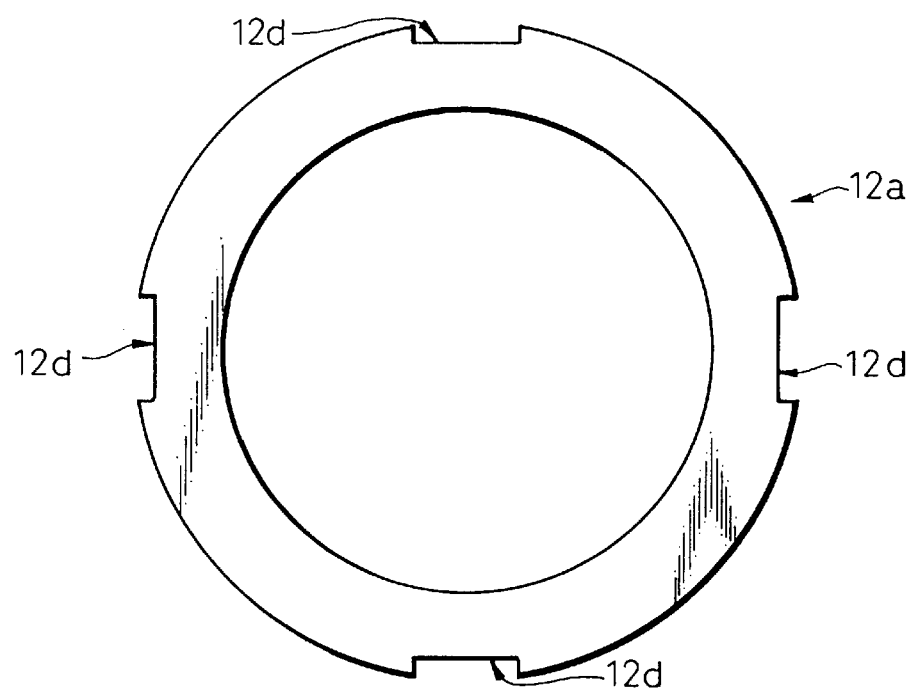
FIG. 3 is an axial view of the outer lace 12a of the one-way clutch 12 of the first embodiment.

FIG. 3 is an axial view of the outer lace 12a of the one-way clutch 12 and illustrates grooves 12d that engage with projections 11d (see FIGS. 4 and 5) of the stator 11.

Figure 4:
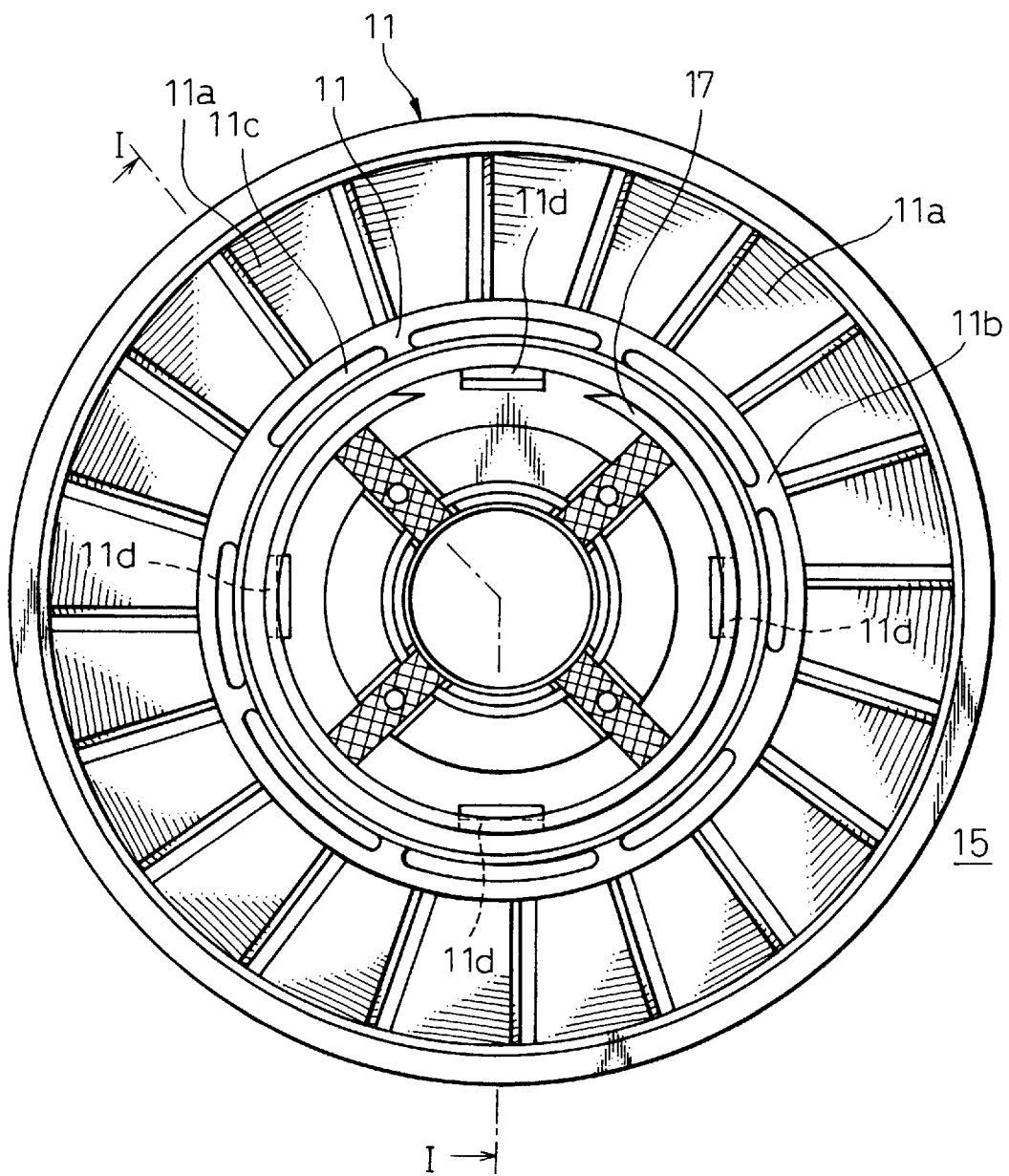
FIG. 4 is an axial view from the side of a second one-way clutch support plate 15 of an assembled stator 11 and one-way clutch 12 of the first embodiment.

FIG. 4 is an axial view from the side of a second one-way clutch support plate 15 of assembled stator 11 and second one-way clutch support plate 15. In FIG. 4, a snap ring 17 covers, like a belt, the junction portion between the radially inner surface of the stator 11 and the radially outer surface of the first one-way clutch support plate 14 over an angle range of about 300 degrees.

Figure 5:
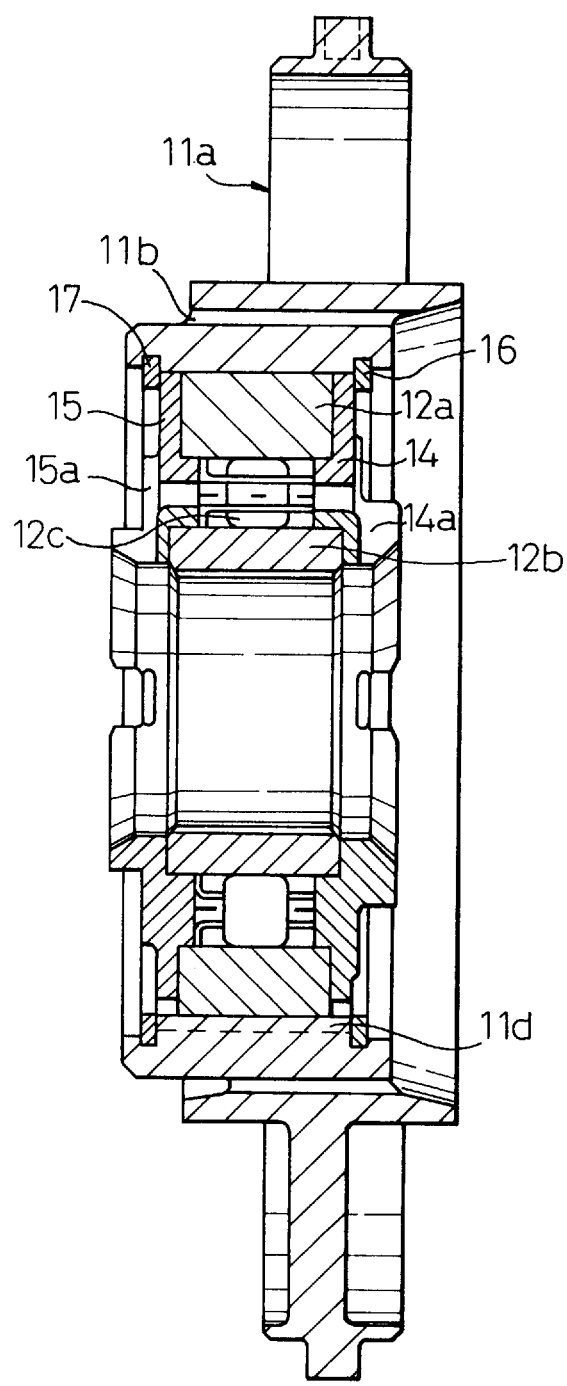
FIG. 5 is a sectional view taken along a line I—I of FIG. 4.

FIG. 5 is an axial sectional view illustrating the stator 11 and the first one-way clutch support plate 14 that are assembled together, taken along a plane passing through the axis, wherein the lower half is a sectional view of a portion where neither oil passage 14a nor 15a is formed, and the upper half illustrates a portion where the oil passages 14a and 15a are formed. Reference numeral 11d denotes projections arranged on the radially inner surface of the stator 11 and extending in the axial direction.

Described below with reference to FIG. 1 is an oil passage or oil chamber through which the hydraulic operation fluid flows.

The oil passage 100 communicates, via oil passage 14a formed in the first one-way clutch support plate 14, with the oil passage 101 which is defined by the stator base 11b and the radially inner end portion of the pump cover 2. The oil passage 101 is communicated with a oil chamber 102 which is defined by the stator blades 11a and the radially inner end portion of the pump impeller 3.

The oil chamber 102 communicates, via oil passages 103 formed among the pump impellers 3, with oil passage 104 which is defined between the pump impellers 3 and the radially outer end portion of the turbine blades 4.

An oil passage 105 which is formed between the stator base 11b and the first hub 9, and communicates with an oil chamber 106 defined by the turbine blades 4 and also communicates with the oil passage 101. Therefore, the oil passage 101 communicates with the oil chamber 106.

The oil chamber 106 communicates with the oil passage 104 via oil passage 107 formed between the turbine blades 4.

The oil passage 104 communicates with an oil chamber 108 defined by the pump cover 2, turbine cover 5 and damper plate 8 of the lock-up clutch 6. The oil chamber 108 communicates with oil passage 109 defined by the front cover 1 and the lock-up piston 7.

A friction member 7a attached to the lock-up piston 7 protrudes into the oil passage 109 to throttle the flow path.

The oil chamber 108 communicates with the oil chamber 106 via holes 5a formed in the base of the turbine cover 5, and further communicates with an oil chamber 110 defined by the piston 7 of the lock-up clutch 6 and the damper plate 8 via holes 8a formed in the damper plate 8.

An oil chamber 111 is defined by the front cover 1 and the axially end surface of the output shaft 10 on the side of the front cover 1, and the oil passage 109 and the oil chamber 111 communicate with each other via oil passage 22a formed in the third thrust bearing support member 22.

Described below is the flow of the hydraulic operating fluid under each operating condition.

Described below, first, is a basic state, i.e., unlocked state in active running driven by an engine.

In this case, the hydraulic operating fluid is introduced through the oil passages 200 and is drained through the oil passage 100 tracing the following passages.

That is, the hydraulic operating fluid introduced to the oil passage 200 flows into the oil chamber 111 through the oil passages 10b and 10a, and then flows through the oil passage 22a and arrives at the oil passage 109. In the oil passage 109, the hydraulic operating fluid is throttled by the friction member 7a and arrives at the oil chamber 108.

Between the pump impeller 3 and the turbine blades 4 a circulating flow is generated in the counterclockwise direction as indicated by a solid arrow.

The hydraulic operating fluid which arrives at the oil chamber 108, then enters the oil passages 104. From there, assisted by the circulating flow, the hydraulic operating fluid passes through the oil passage 107 and arrives at the oil chamber 106. From there the hydraulic operating fluid further passes through the stator blades 11a of the stator 11, and arrives at the oil chamber 102. The hydraulic operating fluid further flows from the oil chamber 102 into the oil passage 100 via oil passages 101 and 18a.

In the oil passage 109, the flow is throttled, and thereby the oil pressure in the oil passage 109 at the radially inside of the friction member 7a becomes higher than the oil pressure at the radially outside thereof. On the other hand, the oil pressure in the oil chamber 110 which is on the opposite side to the oil passage 109 relative to the lock-up piston 7 is equal to the oil pressure in the oil passages 109 at the radially outside of the friction member 7a. Therefore, the oil pressure acting on the side of the front cover 1 of the lock-up piston 7 becomes higher than the oil pressure acting on the side of the turbine cover 5 thereof. Accordingly, the lock-up piston 7 receives the force in a direction to separate from the front cover 1; i.e., the lock-up piston 7 moves rightward in the drawing, and the lock-up clutch 6 is unlocked.

When the input of the hydraulic operating fluid is changed from the oil passage 200 into the oil passage 100 from the above described state, the hydraulic fluid flows as described below. Then, the hydraulic operating fluid introduced through the oil passages 100 arrives at the oil chamber 102 via oil passages 14a and 101. From there the hydraulic fluid flows through the oil passages 103 assisted by the circulating flow in the counterclockwise direction and arrives at the oil passage 104, and further flows into the oil chamber 108. The hydraulic operating fluid that arrives at the oil chamber 108, initially arrives at the oil chamber 111 through the oil passages 109 and 22a and then flows into the oil passage 200 through the oil passages 10a and 10b. By being throttled in the oil passage 109, however, the oil pressure in the oil chamber 108 gradually decreases. Since the oil chambers 108 and 110 communicate with each other, the oil pressure in the oil chamber 110 increases and the oil pressure acting on the side of the turbine cover 5 of the lock-up piston 7 becomes higher than the hydraulic pressure acting on the side of the front cover 1 thereof. Accordingly, the lock-up piston 7 receives the force toward the front cover 1; i.e., the lock-up piston 7 engages with the front cover 1, and the locked-up state is obtained. Under the locked-up state, the pump impeller 3 and the turbine blades 4 revolve at the same speed and no circulating flow is generated.

Next, described below is the unlocked state in passive running, i.e., in running driven by coasting.

In this case, the roles of the pump impeller 3 and the turbine blades 4 are reversed, the hydraulic operating force is transferred from the turbine blades to the pump impeller 3, and a circulating flow is generated in the clockwise direction as indicated by a broken arrow in the drawing. Therefore, the hydraulic operation fluid introduced through the oil passage 200 arrives at the oil passages 104, further flow by being assisted by the circulating flow, and arrives at the oil chamber 102 and then flows into the oil passages 100 via the oil passages 101 and 14a.

The oil chamber 106 is at a low pressure because it is located on the side where the hydraulic operating fluid that is to be circulated flows out. The oil chamber 102 has a high pressure, on the other hand, because of being located on the side where the operation fluid flows in.

When the hydraulic operating fluid is switched to be introduced into the oil passage 100 under the above condition, the hydraulic operating fluid arrives at the oil passages 101 after flowing through the oil passage 14a, and further flows to enter into the oil chamber 102. Here, however, the hydraulic operating fluid is prevented from entering into the oil chamber 102 due to a high pressure. Therefore the hydraulic operating fluid flows through by-pass passage 11c formed in the stator base 11b and arrives at the oil chamber 106 having a low pressure, via the oil passage 105.

By being assisted by the clockwise circulating flow, the hydraulic operating fluid flows from the oil chamber 106 to the oil passage 104 via the oil passages 107 and arrives at the oil chamber 108. Thereafter, in the same manner as the case of the active running, the oil pressure acting on the turbine side of the lock-up piston 7 increases due to the throttling effect of the friction member 7a, whereby the lock-up piston 7 comes into engagement with the front cover 1 to obtain the locked-up state.

Figure 6:
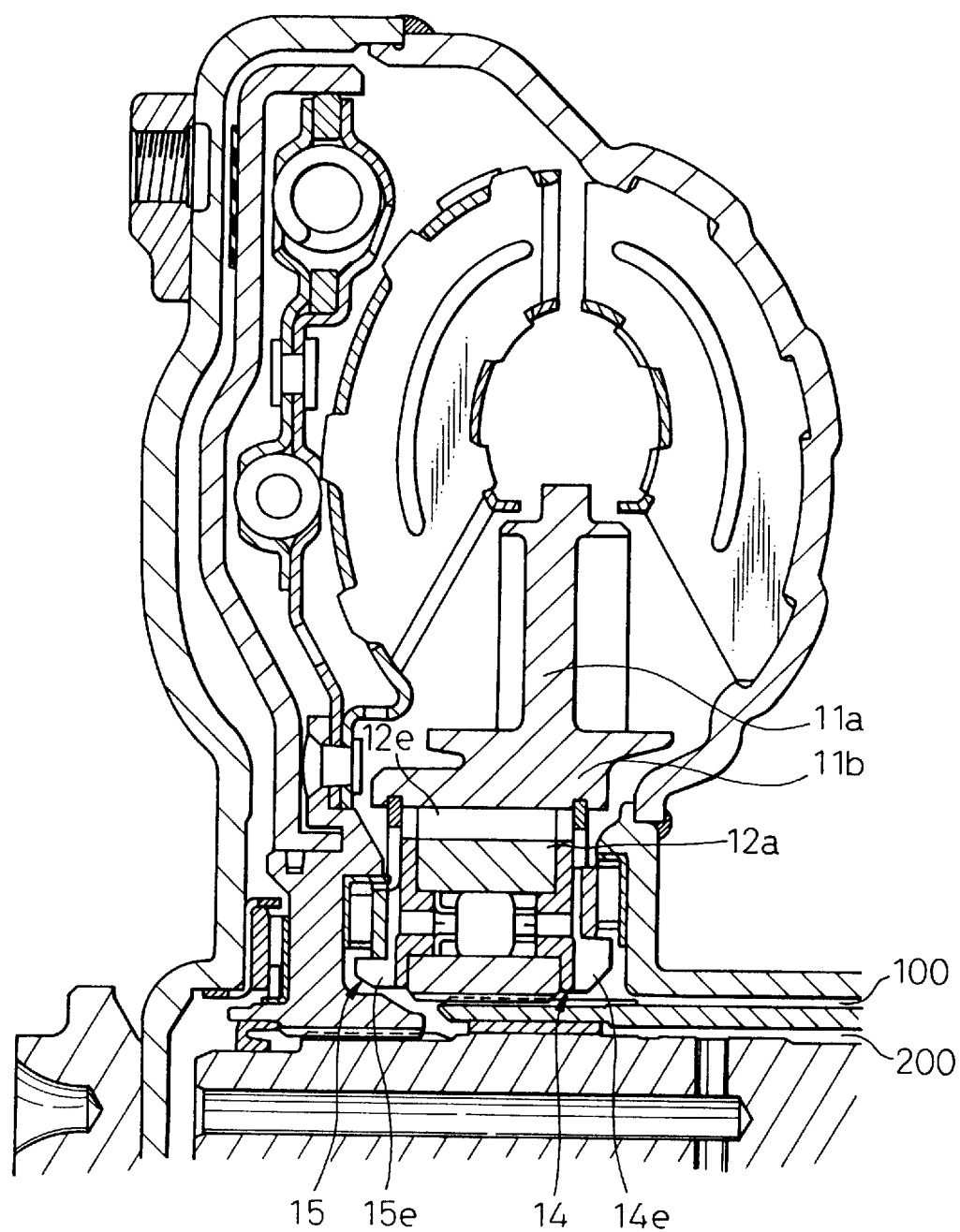
FIG. 6 is a sectional view illustrating a structure of the second embodiment of the present invention.

FIG. 6 is a sectional view illustrating the structure of the second embodiment, wherein reference numeral 12e denotes the oil passage connecting the oil chambers which are formed on both sides of the stator 11. As shown in FIG. 6, the oil passages 12e is formed in the outer race 12a of the one-way clutch 12, instead in the stator base 11b as in the case of first embodiment.

Figure 7:
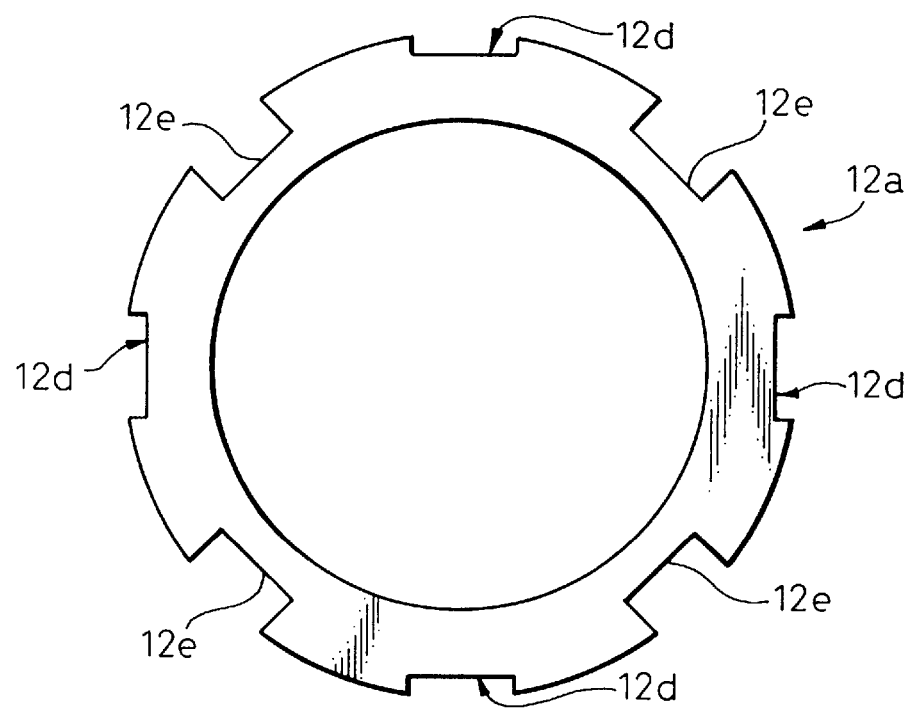
FIG. 7 is an axial view of the outer lace 12a of the one-way clutch 12 of the second embodiment.

FIG. 7 is an axial view of the outer race 12a of the one-way clutch 12 provided with the oil passages 12e.

Figure 8:
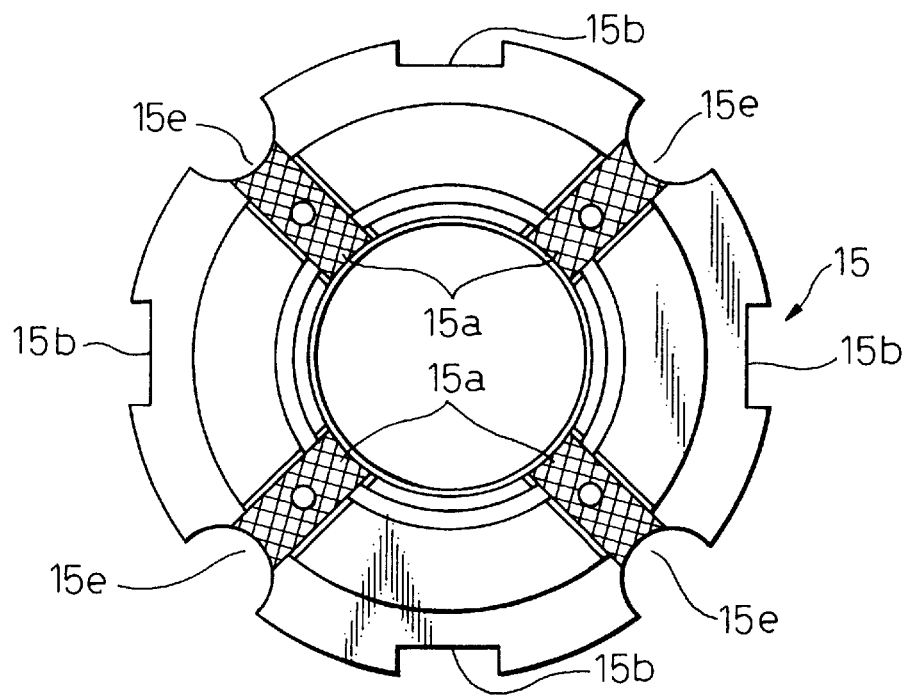
FIG. 8 is an axial view of the second one-way clutch support plate 15 of the second embodiment.

FIG. 8 is an axial view of the second one-way clutch support plate 15 which is used in combination with the outer race 12a in which the oil passages 12e formed. A plurality of cut-outs 15e are formed in the outer circumferential portions of the oil passages 15a. Positions of the cut-outs 15e in the circumferential direction are chosen to be in alignment with the positions of the oil passages 12e formed in the outer lace 12 of the one-way clutch 12. The first one-way clutch support plate 14 is also constituted in the same manner (not shown). Therefore, the outer side of the first one-way clutch support plate 14 communicates with the outer side of the second one-way clutch support plate 15 and, as a result, the oil passage 101 and the oil passage 105 communicate with each other, and the hydraulic operating fluid introduced through the oil passage 100 is guided into the oil chamber 106 to obtain the same effect as that of the first embodiment.

Figure 9:
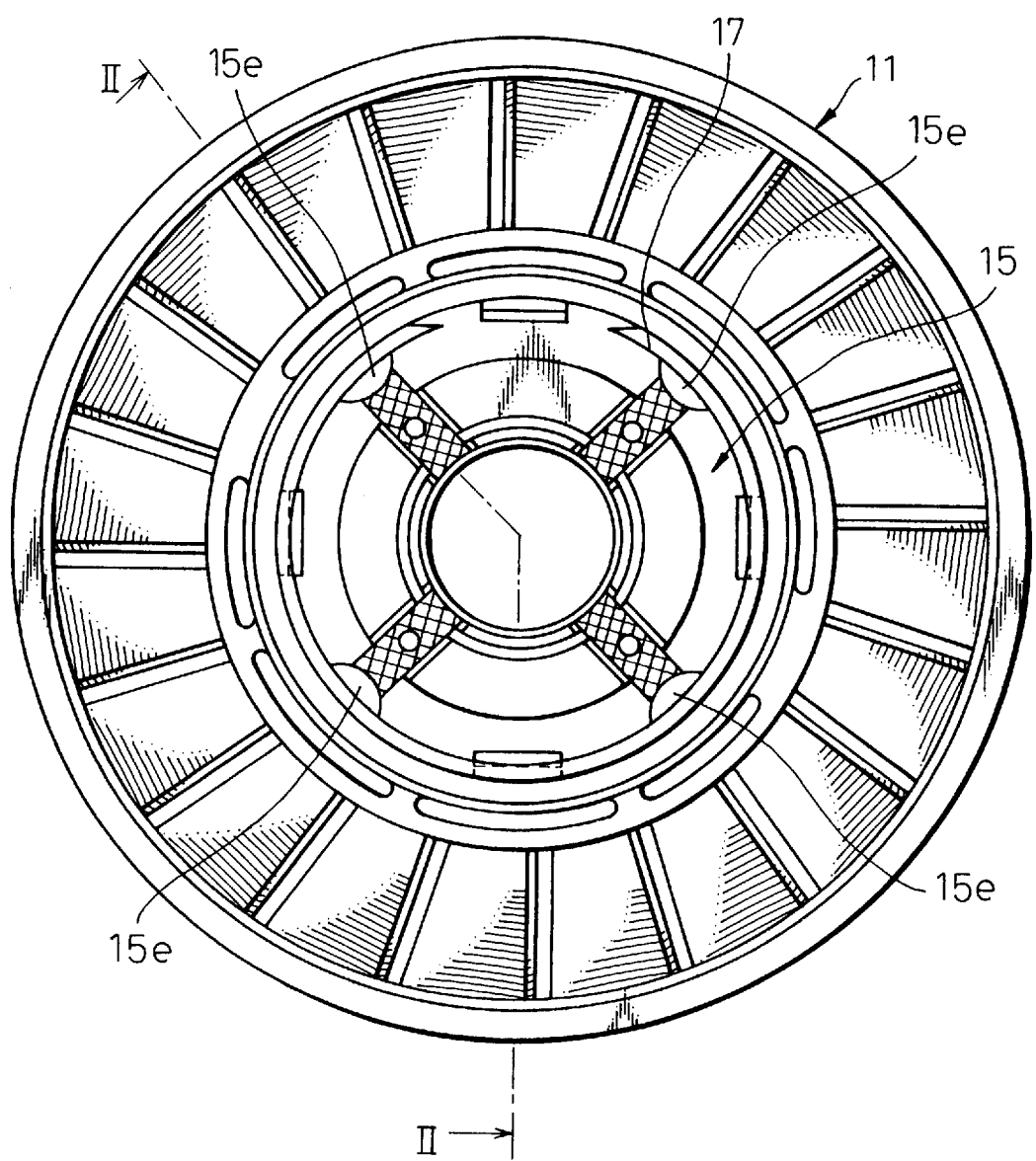
FIG. 9 is an axial view from the side of the first one-way clutch support plate 14 of an assembled stator 11 and one-way clutch 12 of the second embodiment.
Figure 10:
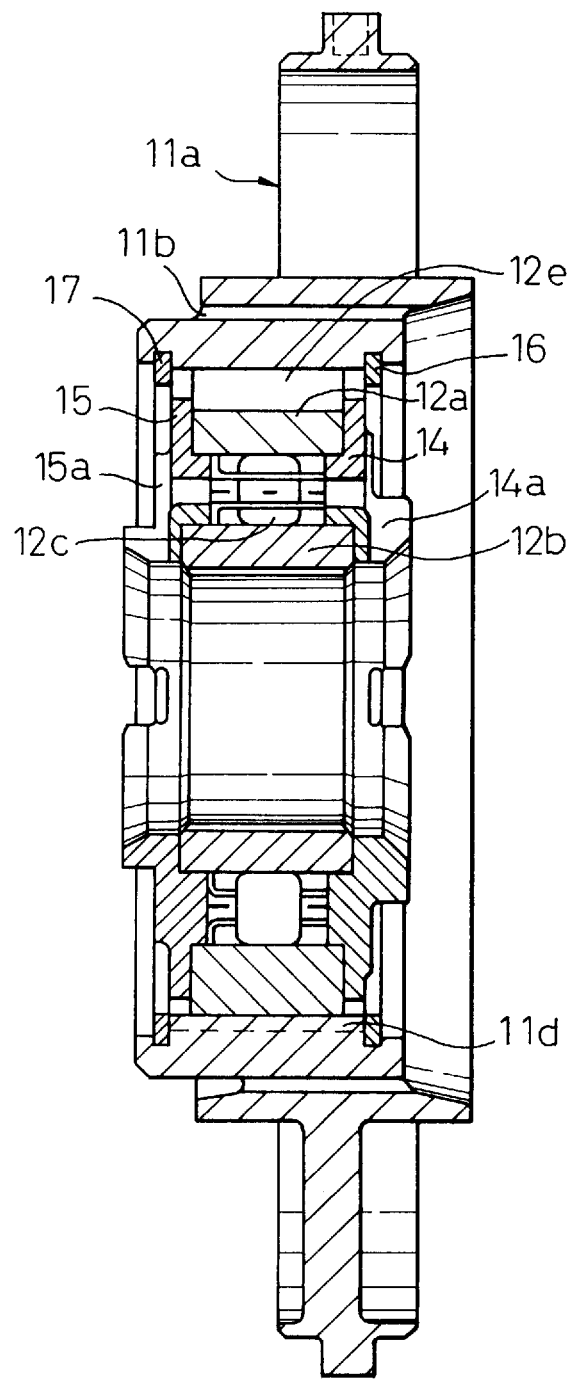
FIG. 10 is a sectional view taken along the line II—II of FIG. 9.

FIG. 9 is an axial view from the side of the first one-way clutch support plate 14 of an assembled the first one-way clutch support plate 14 and the second one-way clutch support 15 on the stator 11, and FIG. 10 is a sectional view taken along the line II—II of FIG. 9.

According to the second embodiment as shown, by-pass passages are formed in the one-way clutch 12, in the first one-way clutch support plate 14, and in the second one-way clutch support plate 15, enabling the conventional stator 11 to be used without any modification.

Figure 11:
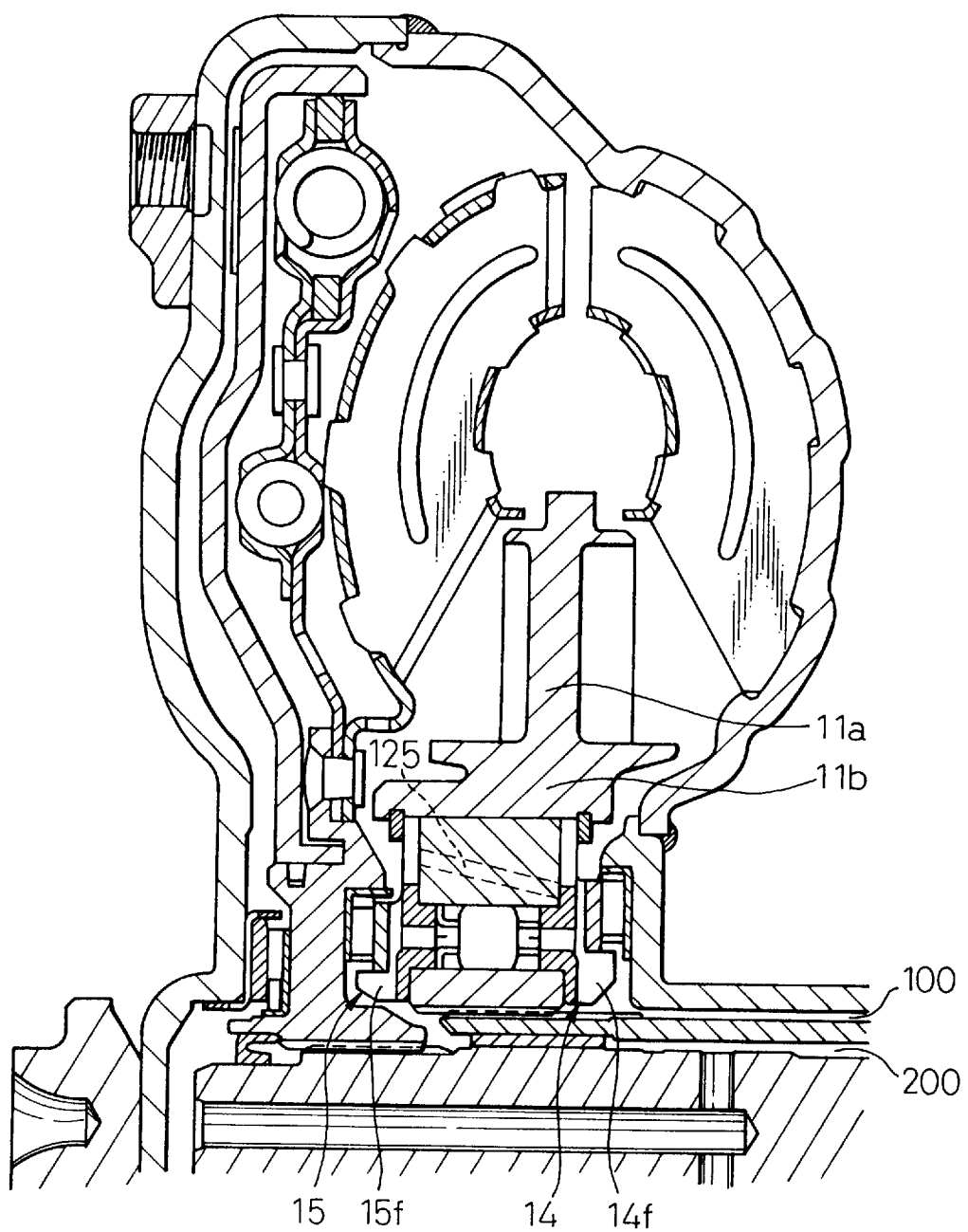
FIG. 11 is a sectional view illustrating a structure of the third embodiment.

FIG. 11 is a sectional view illustrating the third embodiment of the present invention. According to the third embodiment as shown, the outer race 12*a* of the one-way clutch 12 is provided with oil passages 12*f* which are inclined in the direction of outer diameter toward the side of the lock-up clutch 6.

Figure 12:
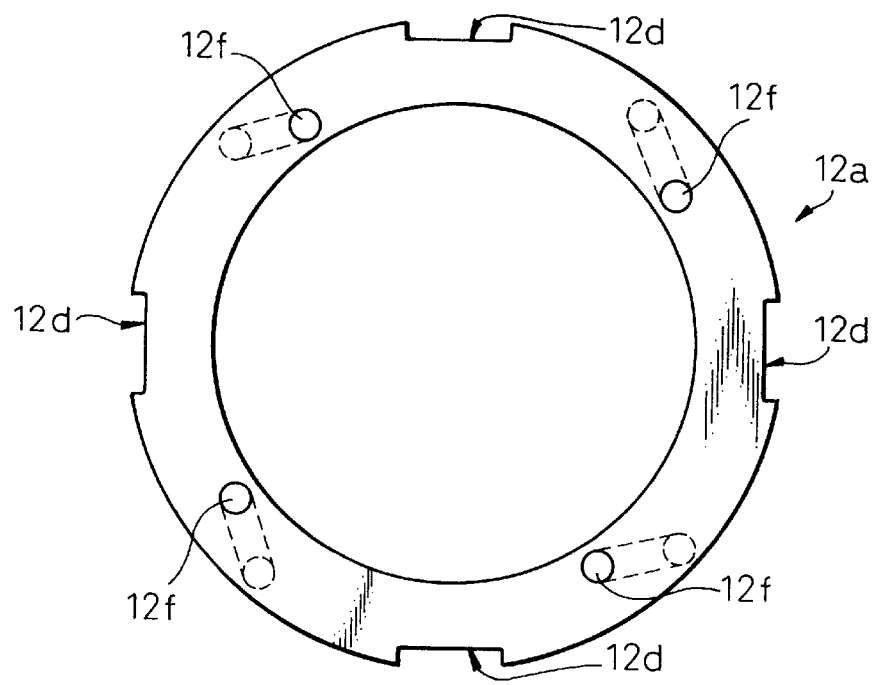
FIG. 12 is an axial view of the outer lace 12a of the one-way clutch 12 of the third embodiment.

FIG. 12 is an axial view of the outer race 12*a* of the one-way clutch 12 provided with the above described passages 12*f*. As shown, the by-pass passages 12*f* are inclined also in the direction of revolution.

Figure 13:
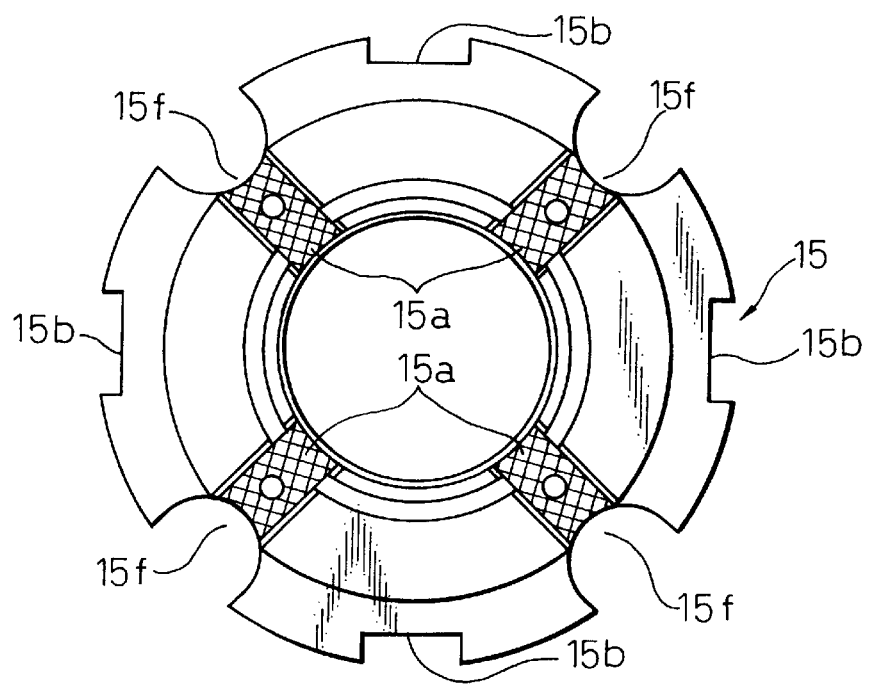
FIG. 13 is an axial view of the second one-way clutch support plate 15 of the third embodiment.
Figure 14:
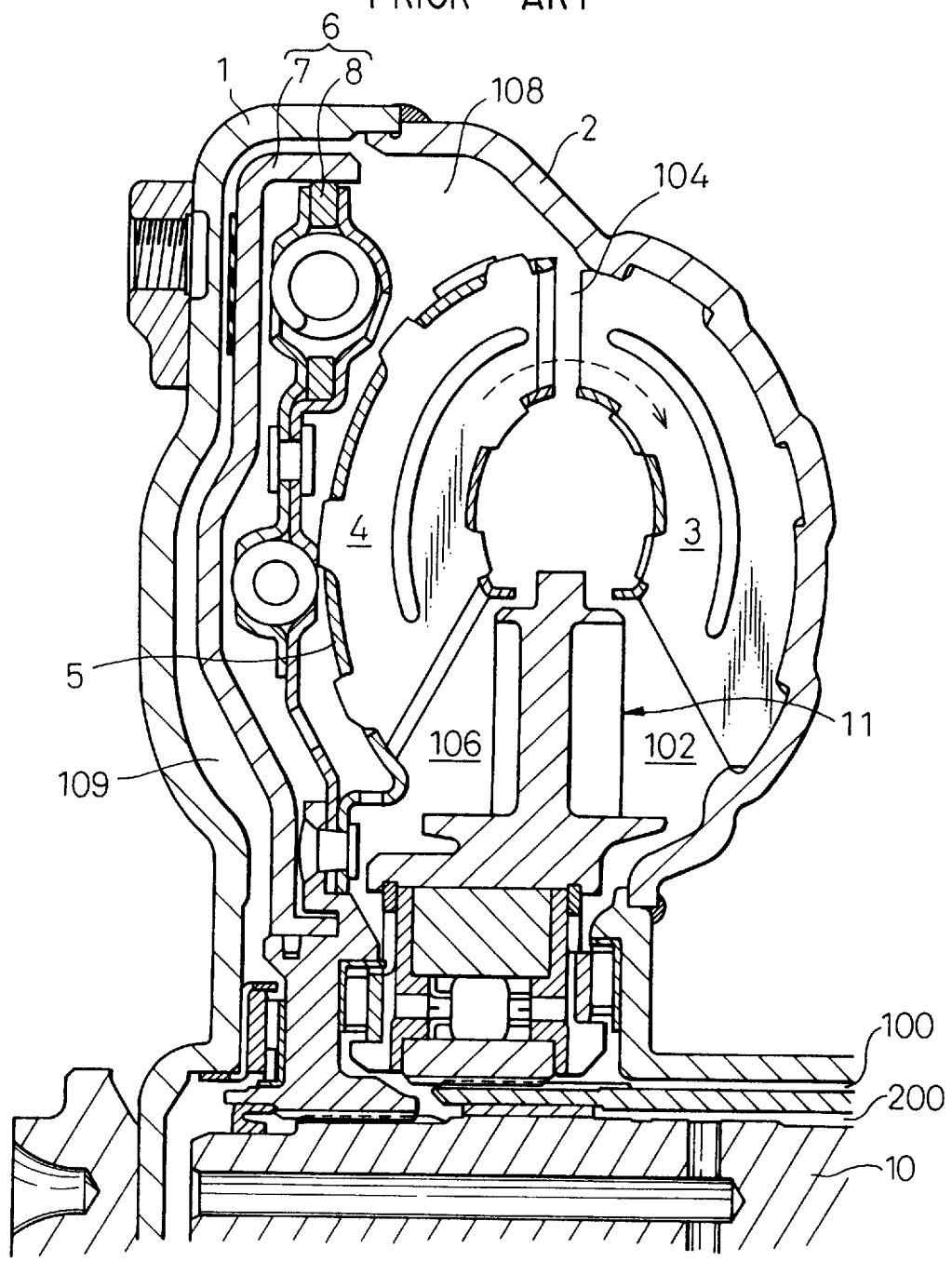
FIG. 14 is a sectional view illustrating the structure of a prior art.

FIG. 13 is an axial view of the second one-way clutch support plate 15 which is used in combination with the outer race 12*a* in which the by-pass passages 12*f* are formed as described above. Cut-outs 15*f* formed in the outer circumferential portions of the oil passages 15*a* are larger than the cut-outs 15*e* in the case of second embodiment so as to be communicated with the by-pass passages 12*f*.

The third embodiment is constituted as described above, and in the third embodiment the by-pass passages 12*f* work as a centrifugal pump accompanying the revolution of the outer race 12*a* of the one-way clutch 12. Therefore, the hydraulic operating fluid introduced through the oil passages 100 can flow into the oil chamber 106 more positively than the case of the second embodiment, and thereby the lock-up piston 7 and the front cover 1 are engaged with each other more smoothly.

According to the present invention, by employing a by-pass passage the unlocked state can be reliably shifted into the locked-up state in a passive running so as to obtain improved engine braking. As a result, the running speed of the engine quickly decreases resulting in a decrease in the consumption of fuel. Besides, the torque converter can have improved response to the action of the driver, contributing to enhancing safety.

By inclining the by-pass passage quick shifting can be obtained.

I claim:

1. A torque converter with a lock-up mechanism used in an automobile, comprising:

a front cover connected with an input member, said input member being connected to an output shaft of an engine;

a pump connected with said front cover, a turbine connected with an output member, said turbine circulating hydraulic operating fluid in said pump and said turbine in cooperation with said pump for thereby hydraulically coupling said input member and said output member;

a stator supported by a fixed member through a one-way clutch and disposed in an area between radially inner portions of said pump and said turbine, said stator rectifying said circulating hydraulic operating fluid;

a lock-up clutch connected with said output member and extended in an area between said turbine and said front cover, said lock-up clutch selectively engaged with said front cover for directly coupling said input member and said output member without the use of said circulating hydraulic operating fluid;

an oil passage, for introducing hydraulic operating fluid used for engaging said lock-up clutch with said front cover, that leads to a first oil chamber defined between said stator and said pump; and a by-pass oil passage branched from said oil passage for communicating said oil passage and a second oil chamber defined between said stator and said turbine so that said hydraulic operating fluid used for engaging said lock-up clutch with said from cover may be introduced into said second oil chamber having lower oil pressure when said turbine pumps said circulating hydraulic operating fluid at the coasting running of said automobile.

2. A torque converter with a lock-up mechanism according to claim 1, wherein said by-pass oil passage is inclined to the radially outside in such a manner that the branching point is located at the most radially inner side.

3. A torque converter with a lock-up mechanism according to any one of claim 1 and claim 2, wherein said by-pass oil passage is located in said stator.

4. A torque converter with a lock-up mechanism according to any one of claim 1 and claim 2, wherein said by-pass oil passage is located in said one-way clutch.

* * * * *

UNITED STATES PATENT AND TRADEMARK OFFICE
CERTIFICATE OF CORRECTION

PATENT NO. : 5,769,196
DATED : JUNE 23, 1998
INVENTOR(S) : KIYOHITO MURATA

It is certified that error appears in the above-identified patent and that said Letters Patent is hereby corrected as shown below:

Claim 1, column 8, line 27, please change "said from cover" to --said front cover--.

Signed and Sealed this

Twenty-sixth Day of January, 1999

Attest:

Attesting Officer

*Acting Commissioner of Patents and Trademarks*